United States Patent [19]
Goebels et al.

[11] Patent Number: 4,819,998
[45] Date of Patent: Apr. 11, 1989

[54] DUAL-CIRCUIT BRAKE SYSTEM

[75] Inventors: Hermann-Josef Goebels, Schwieberdingen; Reiner Emig, Tamm, both of Fed. Rep. of Germany

[73] Assignee: Robert Bosch GmbH, Stuttgart, Fed. Rep. of Germany

[21] Appl. No.: 84,070

[22] Filed: Aug. 11, 1987

[30] Foreign Application Priority Data

Nov. 3, 1986 [DE] Fed. Rep. of Germany ....... 3637420

[51] Int. Cl.$^4$ ..................... B60T 8/38; B60T 15/12; B60T 8/64
[52] U.S. Cl. ..................... 303/118; 303/111; 303/9.73; 188/151 A
[58] Field of Search ............... 180/197; 188/151 A, 188/181 A, 181 C; 303/2, 3, 6 A, 6 R, 7, 12, 15, 40, 52, 92, 110, 111, 113, 115, 117, 118, 119, DIG. 3, DIG. 4, 6.01, 9.66

[56] References Cited

U.S. PATENT DOCUMENTS

| 3,674,317 | 7/1972 | Mangold | 303/118 |
|---|---|---|---|
| 3,907,377 | 9/1975 | Mayer | 303/119 |
| 3,944,290 | 3/1976 | Goebels et al. | 303/118 |
| 4,025,127 | 5/1977 | Rembold | 303/118 |
| 4,045,768 | 8/1977 | Klimek | 188/151 A |
| 4,460,220 | 7/1984 | Petersen | 303/111 X |
| 4,542,944 | 9/1985 | Lyons | 303/6 A X |
| 4,616,881 | 10/1986 | Müller et al. | 303/52 X |

FOREIGN PATENT DOCUMENTS

| 3308546 | 9/1984 | Fed. Rep. of Germany. | |
| 3501381 | 7/1986 | Fed. Rep. of Germany | 303/111 |
| 1369014 | 10/1974 | United Kingdom | 303/118 |

Primary Examiner—Andres Kashnikow
Assistant Examiner—Timothy Newholm
Attorney, Agent, or Firm—Edwin E. Greigg

[57] ABSTRACT

A dual-circuit brake system for utility vehicles is disclosed which enables simultaneous anti-skid regulation in two brake circuits (I, II). To this end, the brake cylinders of the axle of the first brake circuit (I) that is equipped with sensors is monitored directly by pressure control valves and dependent thereon the brake cylinders of the second brake circuit (II) are monitored via relay valves. The circuits are secured from one another via a pressure control lock valve.

8 Claims, 2 Drawing Sheets

DUAL-CIRCUIT BRAKE SYSTEM

BACKGROUND OF THE INVENTION

The invention relates to a dual-circuit brake system as defined hereinafter. A brake system of this type is known (German Offenlegungsschrift No. 33 08 546).

This known brake system is equipped with an anti-skid pressure control valve that makes dual-circuit brake pressure regulation possible and that further requires only one brake circuit for its pilot control. This pressure control valve is preferably used wherever two different brake circuits are operative on the same wheel.

In principle, the known system could also be applied to a vehicle with a double-axle arrangement, in which the various brake circuits each act on one axle and only one of the two axles of the double axle is sensed for anti-skid regulation purposes, for the sake of economy.

However, then the problem arises that—in contrast to the situation when the brake pressures of one vehicle axle are regulated—in a double-axle arrangement the brake cylinder volume is also doubled, so that an enlarged valve embodiment is required for the thereby dictated increased air volume throughput. However, the special valve construction that is then required for this instance is intrinsically expensive and uneconomical, especially if it is unlikely to be manufactured in large quantities.

OBJECT AND SUMMARY OF THE INVENTION

The dual-circuit brake system described above, has the advantage over the prior art that anti-skid regulation of a dual-circuit wheel, axle or double-axle arrangement can be realized with standard components, and in particular standard pressure control valves, and that in the case of a double-axle arrangement, sensing is necessary for only one of the two axles.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
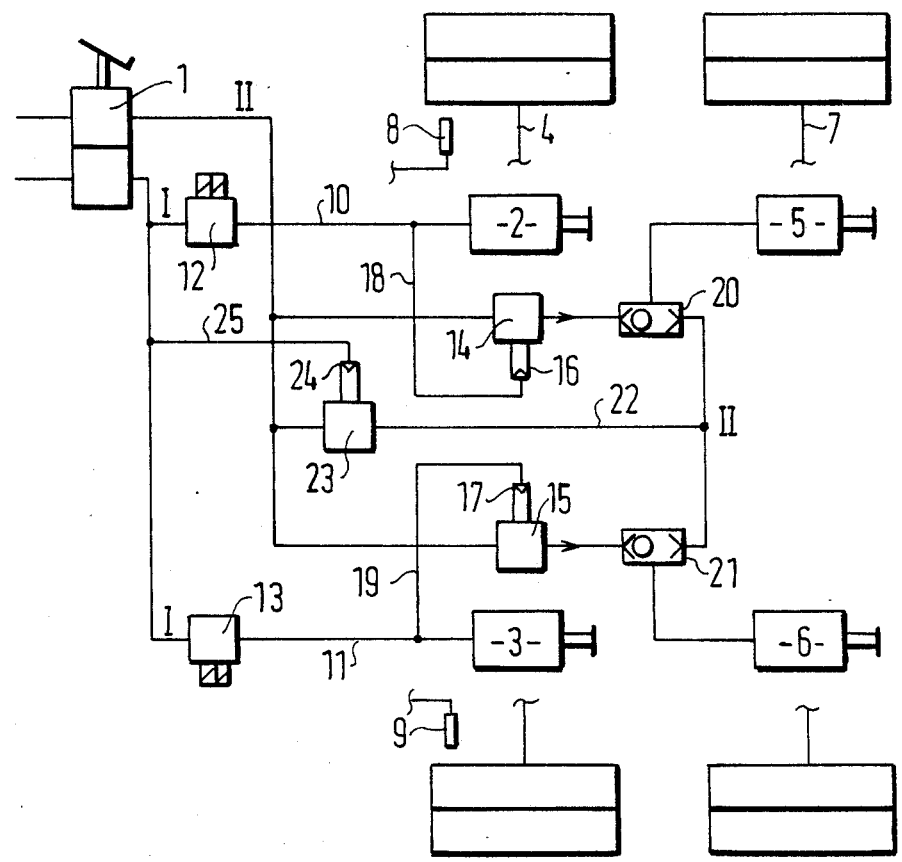
FIG. 1, the brake system according to the invention.

A dual-circuit brake valve 1 supplies two brake circuits I and II, of which the brake circuit I is connected to brake cylinders 2 and 3 of a first axle 4 and the brake circuit II is connected to brake cylinders 5 and 6 of a second axle 7. Two wheel sensors 8 and 9 are provided solely on the wheels of the first axle 4; the sensors are dispensed with on the second axle 7.

The wheel sensors are as a rule installed in the wheels of the axle that has the greater tendency to lock, as compared with the wheels of the other axle. This applies to both driven wheels and nondriven wheels. However, if one of the two axles is embodied as a lift axle, then the wheels of that axle need not continue to be sensed.

A respective anti-skid pressure control valve 12 or 13 is inserted into a direct connecting line 10 or 11 leading from the brake valve 1 to the brake cylinders 2 and 3 of the sensed axle 4. A respective relay valve 14 or 15 is inserted into another line, leading from the brake valve 1 to the brake cylinders 5 and 6 of the unsensed axle 7. Control connections 16 and 17 of these relay valves 14 and 15 are connected via respective control lines 18 and 19 to the brake cylinder 2 or 3 of the brake circuit I, that is, to whichever of the brake cylinders 2 and 3 is located on the same side of the vehicle. Pressure applied at connections 16 and 17 opens valves 14 and 15 to permit passage of fluid through these valves.

A respective two-way shuttle valve 20 or 21 is disposed upstream of the brake cylinders 5 and 6 of the unsensed axle 7, the other side of each valve 20 or 21 being connected via a line 22 to a pressure control lock valve 23. The line 22 is part of the brake circuit II, and the lock valve 23 has a control connection 24, to which control pressure can be delivered from the brake circuit I via a control line 25.

MODE OF OPERATION

In normal braking, when there is no danger of skidding, that is, wheel locking, each axle 4 and 7 is supplied with brake pressure from the respective brake circuit I or II. The relay valves 14 and 15 are switched for open passage here, because the pressure is present in both the controlling brake circuit I and the brake circuit II, so that the outlet of the relay valves 14 and 15 is open.

The passage is closed in the pressure control lock valve 23, because the pressure of brake circuit I is present at the control connection 24.

If there is a danger of skidding or wheel locking during braking, then in an anti-skid regulating operation the brake pressure in the brake cylinders 2 and 3 of the sensed axle 4 is monitored directly by the pressure control valves 12 and 13, respectively. Since the control connections 16 and 17 of the relay valves 14 and 15 are also connected to the brake cylinders 2 and 3, via the control lines 18 and 19, the switching members of the relay valves 14 and 15 also receive a skid-monitored control pressure, so that the brake pressure in the brake circuit II is also skid-regulated accordingly, and then reaches the brake cylinders 5 and 6 of the axle 7 via the two-way shuttle valves 20 and 21. Thus braking is performed in a skid-regulated manner at the unsensed axle 7 as well; in other words, the braking pressure at the unsensed axle 7 is guided along with the sensed axle 4 even in the skidding situation, despite the different brake circuits.

If the brake circuit I should fail, the brake cylinders 2 and 3 of the axle 4 remain pressureless; however, the axle 7 is fully braked, because the pressure control lock valve 23 switches over and allows the brake fluid in the brake circuit II to pass through it. The use of the shuttle valves 20 and 21 assures that this brake pressure will not escape via the open relay valves 14 and 15. Anti-skid regulation can no longer be performed, however, because such regulation can be initiated only at the sensed axle 4. This situation is not critical for the stability of the vehicle being driven, however, because the axle 4 that is not braking assures full lateral traction.

If the circuit II should fail, the axle 7 remains pressureless. Although the relay valves 14 and 15 switch to open passage, nevertheless no pressure prevails at the relay valves. Anti-skid regulation of the sensed axle 4 is assured.

Figure 2:
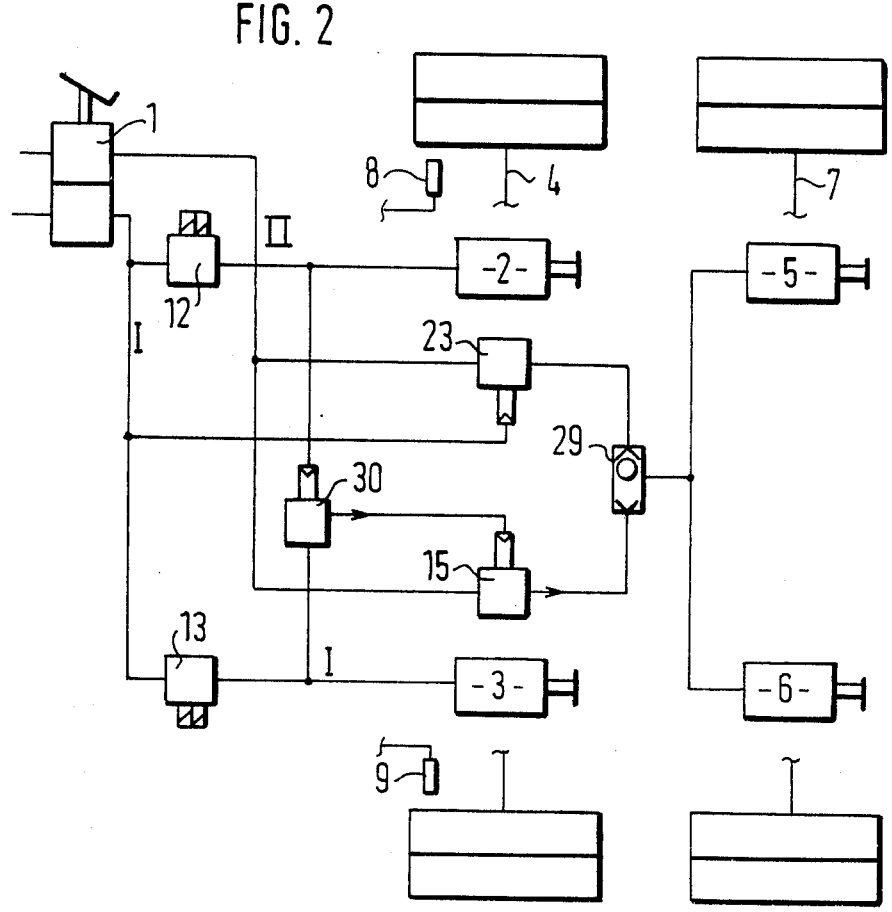
FIG. 2, a modification of the structure of FIG. 1.

FIG. 2 shows a modification of the structure of FIG. 1, and corresponding elements accordingly have the same reference numerals.

here, however, between the two brake cylinders 2 and 3 of the sensed axle 4 in brake circuit I a relay valve 30 is inserted such that at the outlet of the relay valve 30, it is always the lower of the braking pressures of the brake cylinders 2 and 3 that is selected. In the exemplary embodiment, this is attained in that the control connection of the relay valve 30 is connected to the brake cylinder 2 and the supply connection of the same relay valve is connected to the brake cylinder 3. The same function is also attainable via a special select-low shuttle valve. The pressure control lock valve 23 is connected in just the same manner as the lock valve in FIG. 1. The relay valve 15 is always triggered via the relay valve 30 by the lower pressure, in the anti-skid situation, of the two drive axle brake cylinders 2 or 3. As a result, the unsensed axle 7 is then also supplied with this lower level in the anti-skid situation, and the pressure control lock valve 23 remains closed.

Figure 3:
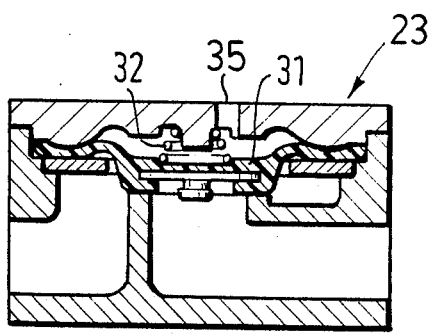
FIG. 3, a detail of a pressure control lock valve.

In FIG. 3, the pressure control lock valve 23 is shown in section. As the drawing shows, this valve has a control and closing member 31, which is embodied as a switching diaphragm and is subject to the action of a weak spring 32. With control pressure introduced via inlet 35, a passage through the lock valve is closed off, and without control pressure, this passage is kept open by the switching diaphragm.

Because a switching diaphragm of this kind is already used as a switching element in anti-skid brake systems, it has already proven itself in terms of its functional reliability. The switching diaphragm is thus a standard component, with a different application.

The dual-circuit brake system proposed here has the advantage that beginning with sensed wheels, direct brake pressure regulation is performed in one brake circuit, and—indirectly dependent thereon—the brake cylinders of a second brake circuit are controlled along with it. The two brake circuits can act simultaneously on the wheels of a single axle, or on the wheels of two or even more axles.

It is also advantageous that the volumetric throughput in double- or triple-axle applications is not critical, because the jointly guided axle or axles are supplied with air and bled via the relay valves 14, 15. The mutual securing of the brake circuits from one another is fully operative. Another advantage is that if one circuit fails the intact circuit remains fully operative.

Finally, the proposed system enables equipping vehicles with anti-skid capability at favorable cost, using standard components, even in vehicles with special brake circuit allocation. For instance, vehicles having one axle or multiple axles, in which two different brake circuits act upon two or more brake cylinders, which simultaneously brake one wheel of one axle or two or more wheels of two or more axles, can be regulated entirely satisfactorily with a quite conventional standard two-control-valve, two-channel, or four-control-valve, four-channel anti-skid brake system.

The disposition of FIG. 2 has a further advantage, one that is particularly important in vehicles having not only an anti-skid system but a drive-slip regulating system installed, in such a way that the sensed axle is a driving axle and the unsensed axle is a nondriven axle. In the case of anti-skid regulation, both axles are braked; but during drive-slip regulation, the undriven axle is not braked, because of the select-low relay valve 30, or a special two-way valve.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A dual-circuit brake system, which includes sensed and non-sensed wheel brakes including brake cylinders, an anti-skid apparatus having wheel sensors, electronic switchgear and first and second pressure control valves inserted into separate brake lines of a first brake circuit (I) leading to the wheel brakes, and which is equipped with an anti-drive-slip system (ASR), wherein said first and second pressure control valves (12, 13) directly control fluid pressure at said brake cylinders of the sensed wheel brakes of said first brake circuit (I), said brake system further including at least one relay valve (14, 15) with which brake pressure of non-sensed wheels of a second brake circuit (II) is controlled;

a relay valve (30) which is connected to the brake lines of said first brake circuit (I) which are controlled by said first and second pressure control valves (12, 13), and which always passes the brake fluid having the lower brake pressure;

a brake pressure lock valve (23) which controls the brake fluid pressure of one brake circuit with respect to the other brake circuit, said brake pressure lock valve (23) including a housing having an inlet and an outlet; and a control and closing member (31) embodied as a switching diaphragm between said inlet and outlet, and a spring that applies a spring tension onto said switching diaphragm, whereby pressure applied onto said switching diaphragm prevents fluid flow through said brake pressure lock valve (23) to said second brake circuit.

2. A dual-circuit brake system as defined by claim 1, which includes two-way shuttle valves (20, 21) that connect said relay valves (14, 15) and said pressure control lock valve (23) to the brake cylinders of the non-sensed wheels of said second brake circuit (II).

3. A dual-circuit brake system as defined by claim 1, which comprises one driven axle and one nondriven axle.

4. A dual-circuit brake system, which includes sensed and non-sensed wheel brakes including brake cylinders, an anti-skid apparatus having wheel sensors, electronic switchgear and first and second pressure control valves inserted into separate brake lines of a first brake circuit (I) leading to the wheel brakes, and which is equipped with an anti-drive-slip system (ASR), wherein said first and second pressure control valves (12, 13) directly control fluid brake pressure at said brake cylinders of the sensed wheel brakes of said first brake circuit (I), said brake system further includes relay valves (14, 15) with which brake pressure of non-sensed wheels of a second brake circuit (II) is controlled;

a brake pressure lock valve (23) which controls the brake fluid pressure of one brake circuit with respect to the other brake circuit, said brake pressure lock valve including a housing having an inlet and an outlet;

a control and closing member which is embodied as a switching diaphragm (31) between said inlet and outlet, and a spring which applies a spring tension onto said switching diaphragm; and two-way shuttle valves (20, 21) that connect said relay valves (14, 15) and said pressure control lock valve (23) to the brake cylinders of the non-sensed wheels of said second brake circuit (II), whereby pressure applied onto said switching valve prevents fluid flow through said brake pressure lock valve (23) to said brake cylinders of the non-sensed wheels.

5. A dual-circuit brake system as defined by claim 4, in which a control connection of each of said relay valves (14, 15) is connected to a brake pressure line that is controlled by at least one pressure control valve, and a supply pressure connection of each of said relay valves (14, 15) is connected to said second brake circuit (II).

6. A dual-circuit brake system as defined by claim 5, which includes trailing axle cylinders (5, 6) disposed in said second brake circuit (II) which are indirectly controlled by directly controlled drive axle brake cilinders (2, 3) located in the first brake circuit (I) and which are effected on the basis of which drive axle brake cylinder is effected.

7. A dual-circuit brake system as defined by claim 4, which includes an additional relay valve (30) which is connected to the brake lines of the first brake circuit (I) which are controlled by the pressure control valves (12, 13), and which always passes the brake fluid having the lower brake pressure.

8. A dual-circuit brake system as defined by claim 4, which comprises one driven axle and one nondriven axle.

* * * * *